United States Patent [19]

Carlson

[11] 4,040,013

[45] Aug. 2, 1977

[54] CITIZENS ALARM SYSTEM

[75] Inventor: Tom Walter Carlson, Paterson, N.J.

[73] Assignee: North American Philips Corporation, New York, N.Y.

[21] Appl. No.: 539,783

[22] Filed: Jan. 9, 1975

Related U.S. Application Data

[63] Continuation of Ser. No. 340,769, March 13, 1973.

[51] Int. Cl.[2] .................. G08B 25/00; H04Q 9/00; H04M 11/06

[52] U.S. Cl. .................. 340/164 R; 179/3; 179/5 R; 340/298; 340/416

[58] Field of Search ......... 340/164 R, 171 R, 171 PF, 340/167 A, 213, 416, 413, 298, 292; 179/2 A, 3, 5 R

[56] References Cited

U.S. PATENT DOCUMENTS

| | | | |
|---|---|---|---|
| 3,069,673 | 12/1962 | Ward et al. | 340/416 |
| 3,233,232 | 1/1966 | Brennon | 340/298 |
| 3,307,176 | 2/1967 | Sadler | 340/292 |
| 3,384,714 | 5/1968 | Weld et al. | 179/3 |
| 3,492,426 | 1/1970 | Foreman et al. | 179/5 |
| 3,522,378 | 7/1970 | McLeod | 179/3 |
| 3,634,824 | 1/1972 | Zinn | 340/167 A |
| 3,673,329 | 6/1972 | Weld | 179/3 |
| 3,678,512 | 7/1972 | Fergus | 340/416 |
| 3,725,865 | 4/1973 | Fairchild | 340/213 R |
| 3,754,215 | 8/1973 | Blomenkamp | 340/167 A |
| 3,815,112 | 6/1974 | Kleber | 340/409 X |
| 3,842,208 | 10/1974 | Paraskevakos | 179/2 A |

*Primary Examiner*—Donald J. Yusko
*Attorney, Agent, or Firm*—Frank R. Trifari; Henry I. Steckler

[57] ABSTRACT

A combined police and fire alarm system has provision for voice communication between street corner boxes and a central station via existing telegraphic cables. The boxes automatically transmit identification signals to the central station upon being activated. The central station can check out the boxes by causing them to transmit their identification signals and an audio test signal.

7 Claims, 9 Drawing Figures

CITIZENS ALARM SYSTEM

This is a continuation of application Ser. No. 340,769, filed Mar. 13, 1973.

The present invention relates to alarm systems, and more particularly to alarm systems with voice communication and provision for remotely checking the call boxes.

Prior art telegraphic fire alarms have numerous disadvantages. One of the biggest is that every alarm must be responded to by the fire department. As a large percentage of alarms are false, men and equipment are wasted responding to them, when they could be going to real alarms. Even if the alarms are not false, the response may be too large for the magnitude of the fire. The boxes also become inoperative and require repair. However, which boxes are inoperative can only be determined by having personnel in the field check them. The box actuator does not known if the alarm has been received until fire apparatus responds. Further no provision for a police alarm is included. Even in the prior art telephone alarm systems, which solved the response problem, the telephone hand sets were frequently vandalized. Some alarm systems use the public telephone lines, which requires a cable pair per box. Also in the prior art systems, each operator handled only a given set of loops, and if he received simultaneous calls, he had to receive help from another operator.

It is therefore an object of the present invention to provide a firm alarm system that enables an operator to determine a false alarm and to send only the required amount of equipment to a real alarm.

It is a further object to provide for checking the operativeness of the boxes from the central station.

It is still further object to provide a reliable system.

It is another object to provide a system that is highly vandal proof.

It is yet another object to provide a system that quickly tells a person at an actuated box that the alarm has been received by the central station.

It is a still further object to combine police and fire alarms using the same circuit.

It is another object to have an alarm system that uses existing fire alarm telegraphic cable loops.

It is still yet another object to enable a free operator to take a call from any loop if required.

In brief, these and other objects are achieved by having a voice communication means so that the propensity to actuate false alarms is reduced. Also the actuator can tell the operator the seriousness of the fire, and therefore only the correct amount of equipment and men can be dispatched. A means for causing the box to transmit its identifying digits and a tone signal is provided at the central station so that a complete verfication of the box's ability to perform its intended function is verified during testing. Redundency and parity checking means are provided to ensure reliability. Separate activation means at the box are for police and fire alarms. A tone is switched through the speaker as soon as either switch is turned on, and therefore, the actuator knows that the box is working. Filtering is used to enable telegraphic cable loops to pass voice frequencies. The calls are distributed to the operators on the basis of traffic rather then line groups, so as to handle the call as fast as possible.

Other objects, features and advantages will become apparent from the description when taken in conjunction with the accompanying drawings in which.

Figure 1:
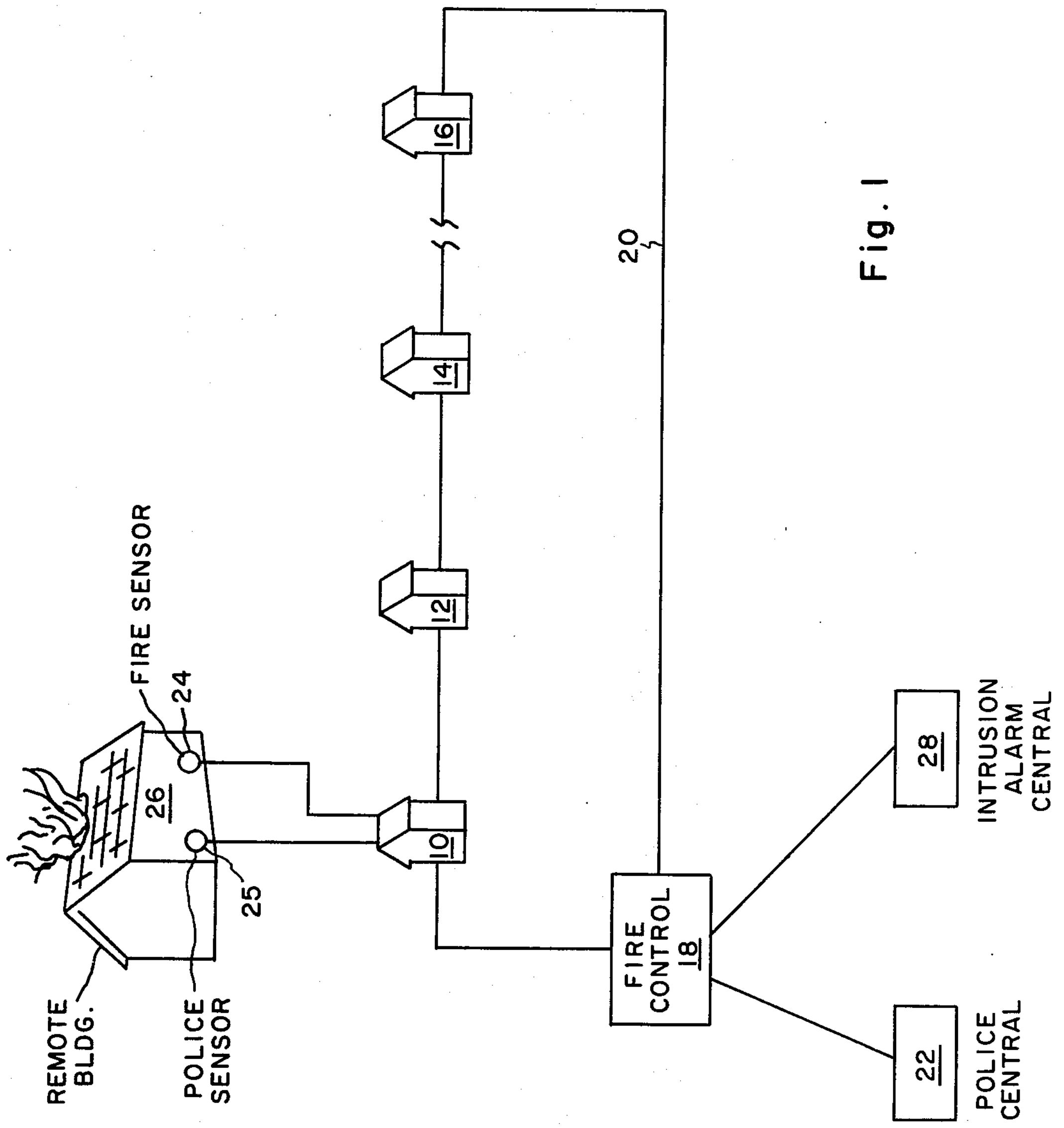
FIG. 1 is a block diagram of the overall system of the invention.

FIG. 1 shows the overall system of the invention. A plurality of alarm boxes 10, 12, 14, and 16 are located in the streets and are coupled together and to a fire central office 18 by means of a series loop 20. This loop is normally the existing Fire Department cable that in the prior art coupled "code wheel" type fire alarms to the fire central office 18. These alarms are removed, and the alarms in accordance with the present invention are preferably installed in the same boxes that the old alarms used. A new central station 18 is then required. Although only four alarms 10 and 16 are shown in FIG. 1, it will be appreciated that many more, typically 32, are on one series loop. In addition, although only the loop 20 is shown coupled to fire central office 18, typically the number loops that are coupled to fire central 18 number in the hundreds. Each of the boxes 10–16 have two handles or buttons (not shown) to call the fire or police department respectively. For voice communication the boxes have a loudspeaker and a microphone (neither shown). If the alarm is for the police, the call is automatically routed from fire central 18 to a police central station 22. Since the loop 20 is used far more often for fire than for police alarms, several fire centrals are coupled to one police central 22 even though only one is shown in FIG. 1.

In addition, each of the boxes has provision for at least one of the automatic remote fire and police sensors 24 and 25, say at a school 26, which signal that a fire or an intrusion respectively is taking place there. The intrusion signal from sensor 25 is routed by the fire central 18 to a special intrusion central 28, where specially trained operators who known when, say, the janitor is entering or leaving, and therefore can distinguish a false alarm causes by this form a true criminal intrusion and dispach the police only in that case. The alarm from fire sensor 25 goes only to fire central 18, since the probability of a false alarm is much less in that case. If an alarm is originated from the boxes 10–16, then voice communication is possible and respective operators at the fire and police centrals 18 and 22 can gain information as to the extent of the energency and decide on the appropriate action, if any, to take, e.g. send firemen or police in appropriate number and with appropriate equipment to the scene. This saves on men and equipment if only small numbers of either or both are required. In addition, since the person sending the alarm must talk to the operator, the propensity to actuate false alarms is greatly reduced.

Figure 2:
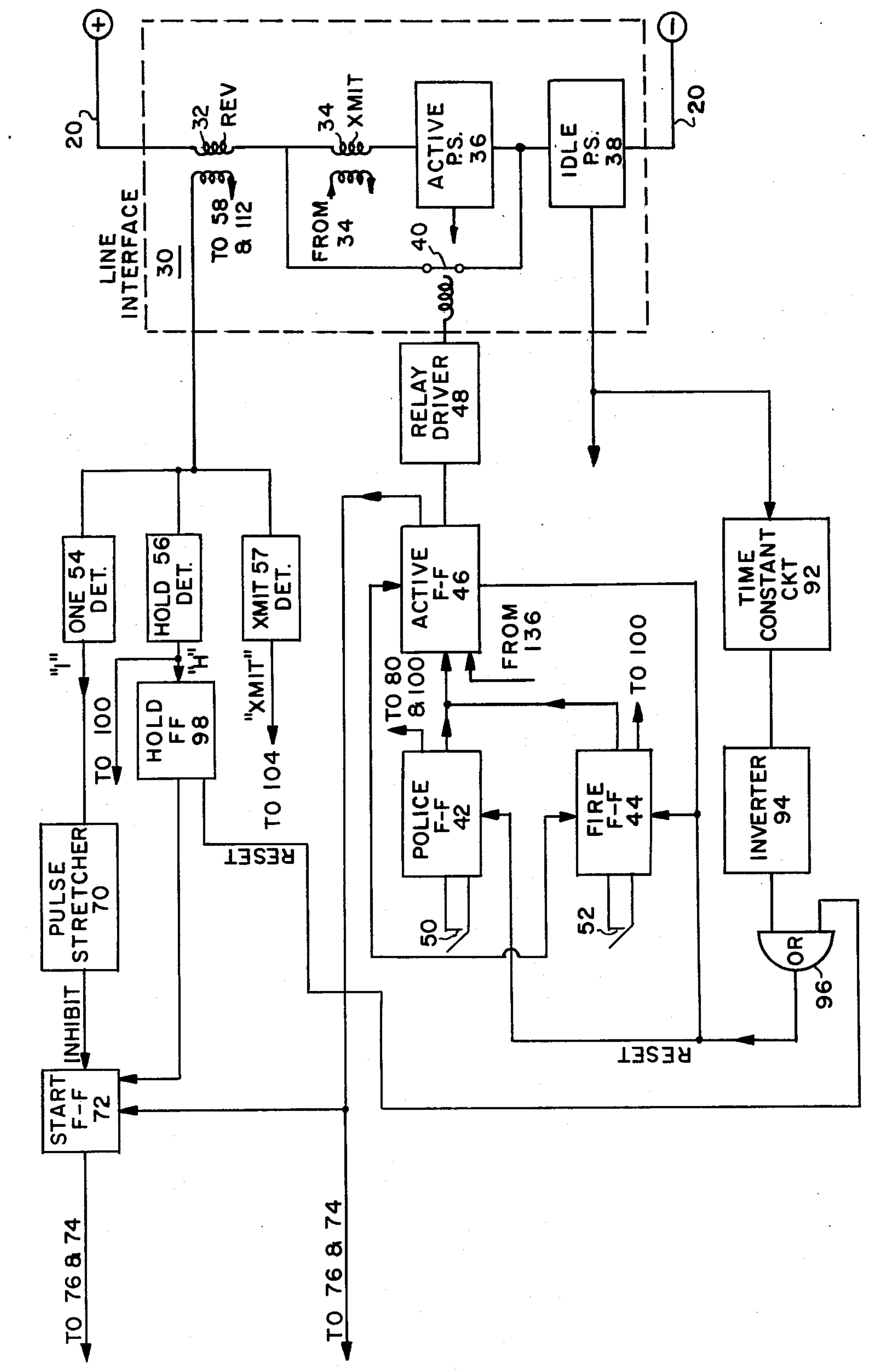
FIG. 2 is a diagram of that part of the box coupled to the signalling loop.

FIG. 2 shows some details of the identical boxes 10–16. Fire central 18 supplies a constant current DC power through the loop 20, and therefore if loop 20 is cut at any point for the insertion of the boxes, positive and negative ends are thereby defined. This current is applied to line interface circuit 30, with the positive end of loop 20 serially connected to a "receive from central" transformer 32, a "transmit to central" transformer 34, an active power supply 36, an idle power supply 38, and then to the negative end of loop 20. Each of the power supplies 36 and 38 comprises a Zener diode with filter capacitors across them (not shown). A normally closed relay 40 short circuits the transmit to central transformer 34 and active supply 36 so that they are normally inactive. However, the idle supply 38 is always supplying a low voltage to certain circuits in the box as long as there is DC in loop 20. Among these circuits are police, fire, and active flip flops 42, 44 and 46 are relay driver 48. Either of the police and fire flip flops 42 and 44 can set active flip flop 46. Police and fire handles or buttons are disposed on the outside of the boxes 10-16 and have switches 50 and 52 coupled to them. If, say, the police switch 50 is closed, police flip flop 42 is set, which in turn sets active flip flop 46 and relay driver 48. Relay 40 is then opened, thus energizing active power supply 40 and enabling transmitting transformer 34. Since active flip flop 46 stays in its set position, the active power supply 40 stays on even when the switches 50 and 52 are released shortly after being actuated. The active supply 40 applies power to those call box circuits that are coupled to it after about 300 milliseconds, which is the charging time of its capacitors. If the fire switch 52 were pulled, then fire flip flop 44 would set active flip flop 46 with the same results on active power supply 36.

Figure 3:
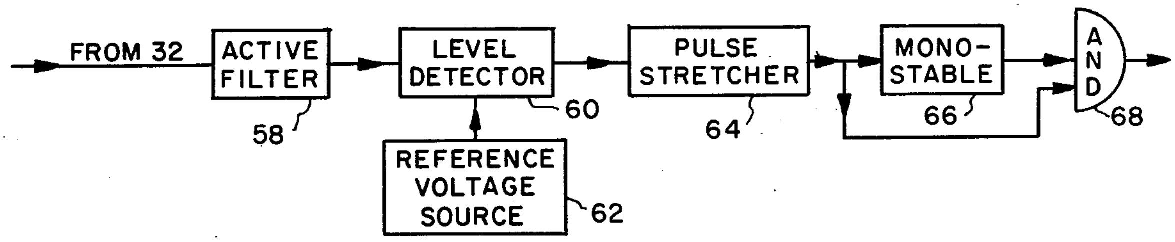
FIG. 3 is a diagram of a tone detector.

In the present embodiment the boxes and central communicate by using four tone frequencies: a "1" frequency of about 140 Hz, a "0" frequency of about 100 Hz a hold, "H", tone of about 220 Hz, and a "transmit" tone of about 270 Hz. At the box three of these tones are detected by frequency selective tone detectors 54, 56, and 57 respectively, which are coupled to receive transformer 32. Each of these detectors are identical except, of course, for the frequencies to which they are tuned. One of said detectors is shown in FIG. 3.

The output signal from receive transformer 32 is coupled to an active filter 58 which filters all signals other than the desired tone frequency. Naturally an L-C or other type of filter could be used, but an active filter can be made in integrated circuit form, is cheaper, and thermally stable. The output signal from filter 58, which is a sine wave, is applied to a level detector 60 where it is compared to reference voltage from reference voltage source 62. The resultant output signal substantially comprises a pulse train. This train goes to a pulse stretcher 4, which supplies a continuous DC output signal as long as it is being supplied with input pulses. Monostable circuit 66 is triggered by the DC level from stretcher 64 and supplies a 70 millisecond pulse to AND gate 68. Also supplied to gate 68 is the DC lever from stretcher 64, and thus an autocorrelation is performed to help the circuit reject spurious signals. Therefore a 1, H, or transmit signal is applied at the output of gate 68 depending upon the frequency of filter 58.

It will be recalled that the box has been activated by closing switches 50 or 52, and it is desired to send digital tone signals identifying the particular box to central. However, since another box might be signalling to central 18 when one of switches 50 or 52 is closed, it is important to check the loop 20 to see if this is taking place. If so, then the signalling of the present box must be delayed to avoid confusing the central station with two sets of digital numbers coming to it at once.

Since any possible other activated box will normally be sending tones representing ones and zeros to indicate its box number to central, it is feasible to use the output of the one or zero detectors 54 or 57 to actuate a circuit that will delay signalling by the present box. Although statistically remote, it is possible, however, that the other box will be sending only ones or only zeros. In that case using the output of one of the detectors will not absolutely ensure that only one box will be signaling at any one time. To prevent this, each box before sending its other digits sends a long one, i.e. a one tone that is longer than that normally used. This is detected by the other boxes and delays them from transmitting their tones if they have been activated.

To accomplish detection of the long one pulse, reference is made to FIG. 2 which shows that the output of one detector 54 is applied to a pulse stretcher 70 having 3 to 5 second time constant, and thus supplies an output pulse that is that long. This output pulse is used to inhibit the setting of a start flip-flop 72 by the active flip flop 46. Since, as will be explained below, the start flip flop 72 must be set for the present box to begin signaling, the present box allows 3–5 seconds for the other box to complete its signaling.

Figure 4:
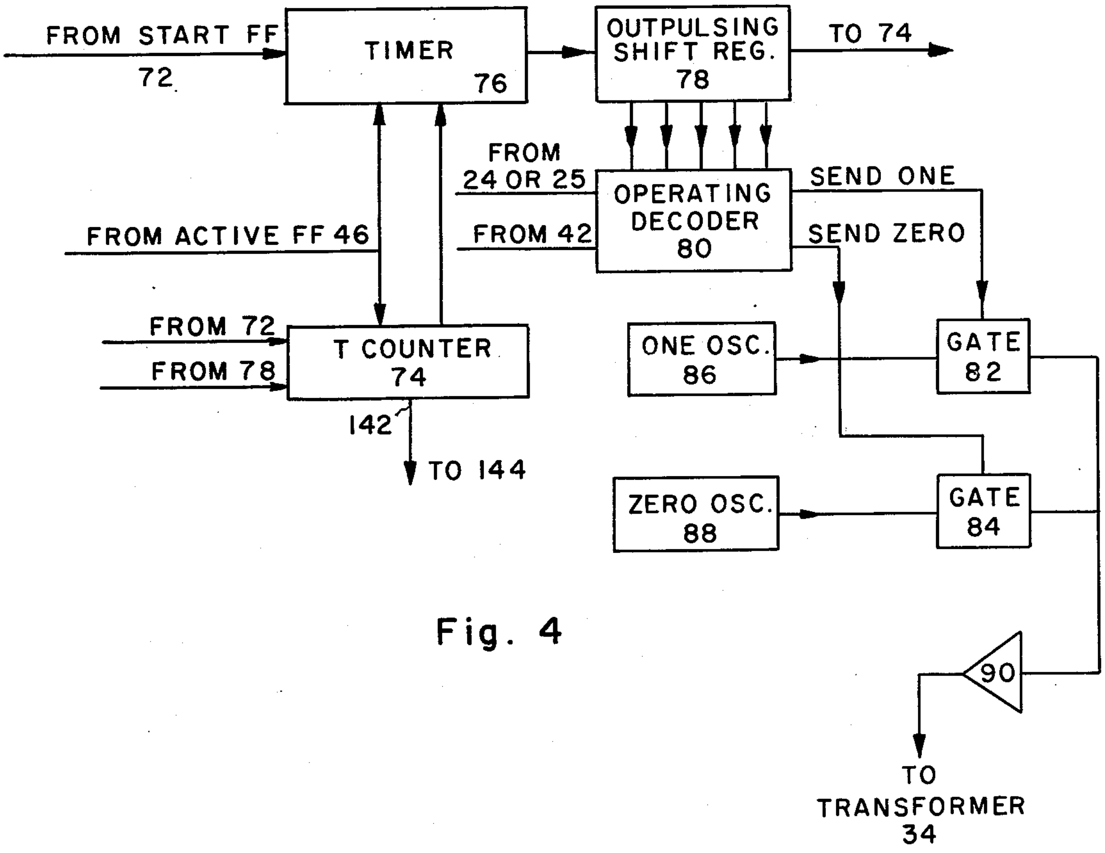
FIG. 4 is a diagram of box timers and shift registers.

Assuming that flip flop 72 is not being inhibited by stretcher 70, the present box is now ready to signal central and FIG. 4 shows the main digital circuitry for doing this. Initially, a four state T counter 74 is set into a $T_o$ position by active flip flop 46, and it in turn enables the timer 76. The timer 76 is also started by a signal from start flip flop 72. This timer 76 comprises a chain of flip flops (not shown) each with a 150 millisecond delay. After a delay of 300 milliseconds to allow the capacitor in the active supply 36 to charge up, a signal from timer 76 starts the shifting within the outpulsing shift register 78. The various states of the flip flop within register 78 (not shown) are decoded in the operations decoder 80 which conventionally comprises several gates (not shown). The output signals from decoder 80, which are "send one" and "send zero" are applied to gates 82 and 84 respectively to open them, and thus let signals from one and zero tone oscillators 86 and 88 respectively flow to amplifier 90, transformer 34, loop 20, and central 18.

The first bit transmitted is the "long 1", and therefore, any other activated box on loop 20 will immediately be blocked from signaling. The next is the service bit, which tells if the police or fire handle 50 or 52 have been pulled. This is done by providing an input to decoder 80 from police flip flop 42. The next bit is an auxiliary bit for indicating that the alarm is coming from remote sensors 24 or 25. Thereafter, five box number digits are sent. The particular digits for each box are "hardwired" into the operations decoder 80. Then comes a spare bit, which can be used for the second of the remote sensors, if such a sensor is used, or can be reserved for possible future expansion. Finally a parity check digit, which is generated by a conventional parity check circuit within decoder 80.

After all the digits have been sent, a pulse from register 78 sets T counter 74 into a $T_1$ state. During this state, the central 18 will normally send back a "hold" to indicate that it has received the digits and decoded them correctly. If such a hold tone is not received by the box, then the counter 74 will successively go on to states $T_2$, $T_3$, $T_o$, $T_1$, $T_2$, $T_3$, etc. Every $T_o$ interval, the register 78 will cause decoder 80 and gates 82 and 84 to transmit the digits, and every $T_1$ interval, the box will listen for the hold tone. This signaling will continue until central uniquely decodes this box, and responds with hold tone, thus positively selecting the calling box.

FIG. 2 shows the circuitry for overcoming the problem of central being unable to positively select a calling box due to box circuit or line failure problems. An RC time constant circuit 92 receives the voltage generated by idle supply 38 and applies it is inverter 94, which generates a reset signal that is applied through OR gate 96 to flip flops 42, 44, and 46. When the operator at the central station sees on his console that a box is tieing up a loop and proper decoding of its digits is not taking place, he cuts off the power in the loop and then reapplies it. During the cut-off period circuit 92 will discharge and then start recharging when power is reapplied. Before circuit 92 is fully charged the inverter 94 will apply the reset signal to the above mentioned flip flops. This will in turn stop T counter 74 and timer 76, and therefore also stop the transmission of the digits. The box can now reactivated by pulling handles 50 and 52. It has been found that most defects will not reoccur if this is done. If they should persist, then of course the box must be replaced or repaired.

Assuming, however, that the box is working perfectly, then during $T_1$, a hold tone will be received from the central 18, and its leading edge detected by hold tone detector 56, which in turn sets hold flip flop 98. This in turn clears start flip flop 72, which stops timer 76, which in turn stops register 78, and finally counter 74 is rest to $T_o$ by register 78.

Figure 5:
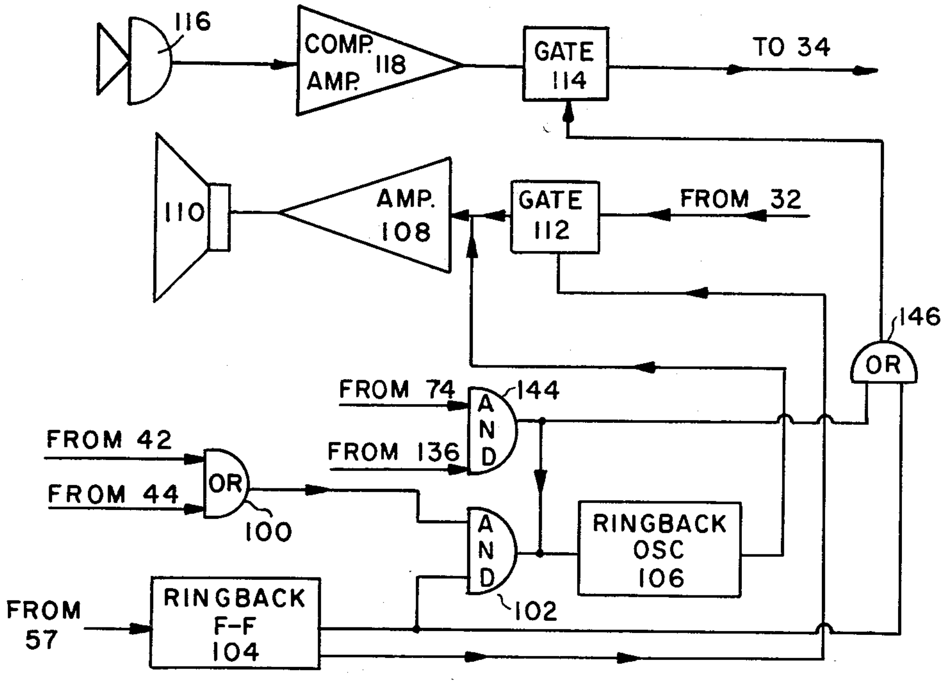
FIG. 5 is a diagram of the box speech circuits.

FIG. 5 shows the speech circuits of the box and some additional logic circuits. This point is appropriate to discuss an operational feature of the present invention, called "ringback", which occurs at a point in time some what earlier than to where the above description has been brought. As soon as either the police or fire flipflops 42 and 43 has been activated, then a signal is supplied from OR gate 100 AND gate 102. If no transmit tone is being received from the central station, then ringback flip flop 104, which is coupled to transmit tone detector 57, is not set, and it supplies a signal to AND gate 102. This in turn enables a ringback oscillator 106, which supplies a ringback tone signal to audio amplifier 108, which tone is acoustically reproduced by a loudspeaker 110. Therefore, as soon as a person pulls either of handles 50 or 52 he hears the ringback tone, and thus knows that the box is functioning.

Returning now to the present instant, when the hold tone has been successfully received and the various counters and registers stopped or cleared as described above, the system is ready for voice communication. To accomplish this, the central station operator presses a push-to-talk switch on his microphone, and this causes a transmit tone to be sent on loop 20 to the box. This tone is detected by transmit tone detector 57, which supplies a signal that sets ringback flip flop 104, and thus cuts off ringback oscillator 106. A signal that is of opposite polarity from that applied to AND gate 102 is applied to gate 112 from a complementary output of flip flop 104, and therefore gate 112 is enabled whenever the transmit tone is being received. This connects amplifier 108 to receive from central transformer 32, thus allowing the central operator to talk to the person who actuated the box. When the central station operator releases the push-to-talk button, the transmit tone is no longer applied to loop 20, flip flop 104 changes state and enables gate 114 through OR gate 146. This connects the microphone 116 through the compression amplifier 114 to the transmit to central transformer 34, thereby allowing the person at the box to talk to central. Clearly, the direction of the conversation is under the control of the central station operator.

When all the necessary information has been given to the central operator, he deactivates the box by causing the hold tone to cease. This resets the hold flip flop 98, which in turn resets the police, fire, and active flip flops 42, 44 and 46 via gate 96. The box is now back in the idle condition, ready to be once again actuated.

Figure 6:
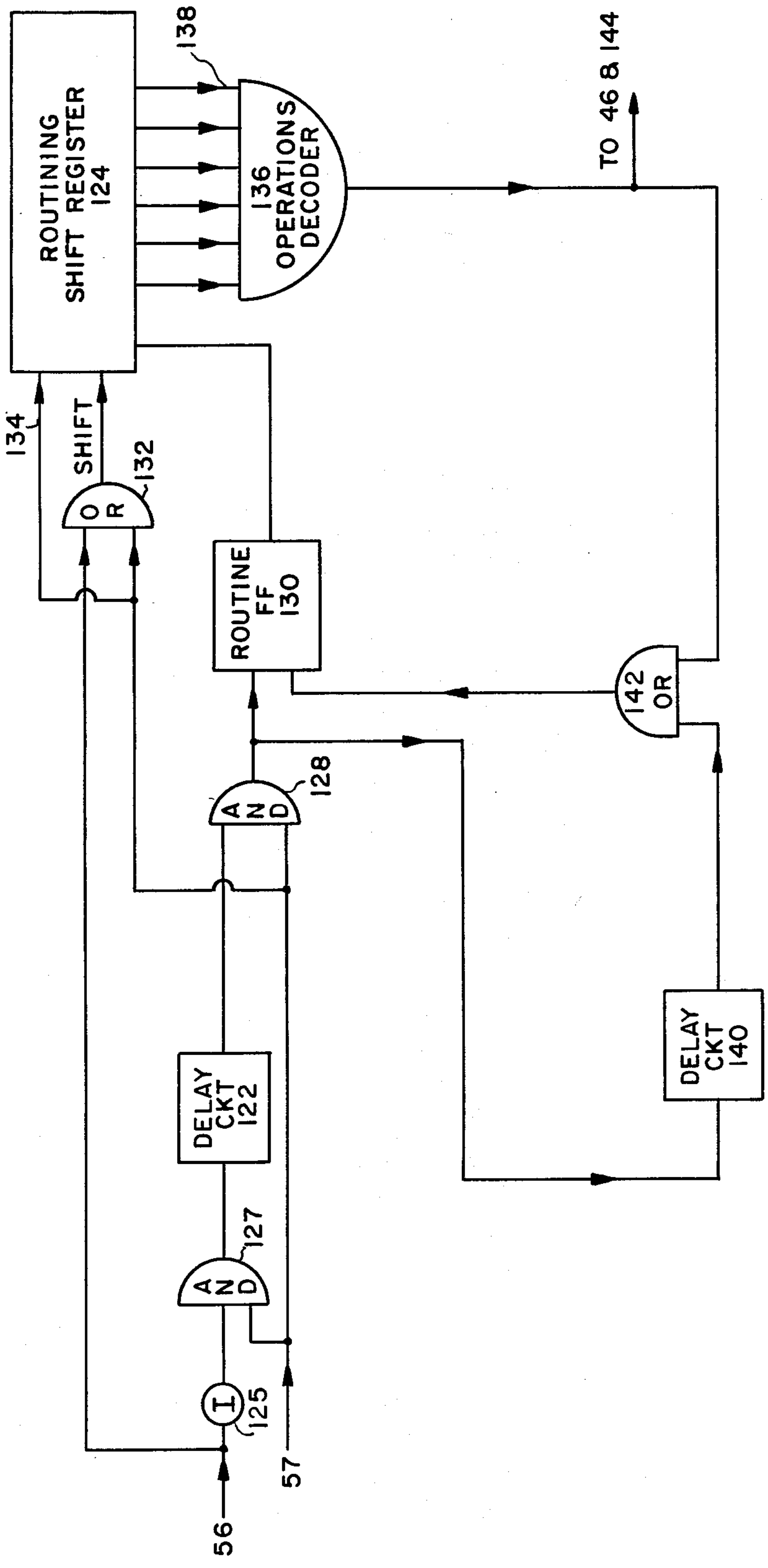
FIG. 6 is a diagram of the box routining circuit.

An important feature of the present invention is the provision for the automatic checking of each of the boxes from the central station. Since each of the boxes is sequentially checked this is called "routining", and FIG. 6 shows the circuits for achieving this. The routining operation is started by the central station sending a long transmit tone without any accompanying hold tone. The detected transmit signal from detector 57 is applied to one input of AND gate 127, and to others as will be described below. The detected absence of hold signal is applied to gate 127 via inverter 125. The output of gate 127 is delayed by delay circuit 122 and applied to gate 128. When gate 128 has an output, this indicates the presence of transmit signal and the absence of hold signal for the duration of the delay of circuit 122. This signal is not normal to the box operation, and is used as a polling signal, indicating to all boxes on a loop that routining mode has been established. The detected transmit signal from detector 57 is also applied to the input 134 of routining shift register 124. The output signal from gate 128 is applied to set a routine flip flop 130, which in turn enables the normally clear register 124 so it can store the detected long transmit tone.

Thereafter the central station uses the normal length transmit and hold tones as ones and zeroes respectively to transmit a digital code representing a particular box number. The detected signals corresponding to these tones are applied to an OR gate 132 and are used to shift the information stored in register 124. The detected transmit tone signal is applied to information input 134 of register 124 as a one, while if a hold tone is sent, then nothing is applied to input 134, but a shift operation takes place, thus storing a zero.

When the storing and shifting operations have been completed then the digits are all stored in register 124 and the original long one will have been moved into the last (furthest right as viewed in FIG. 6) storage position. The stored long one pulse then enables an operation decoder 136 through line 138, and then the decoder 136 compares the digits stored in register 124, with the digit numbers hardwired within it. Naturally, if the system is working properly, in all but one of the boxes on any one loop, there will be no match, and therefore no output signal from decoder 136. Meanwhile, delay circuit 140 was set by the output signal from gate 128. This circuit 140 can be a monostable multivibrator and has about a 1 minute time delay. After said delay, it supplies a pulse through OR gate 142 that resets flip flop 130, which in turn clears register 124. The box is now back in its idling state.

If, however, there is a match, then there will be an output signal from decoder 136. This signal is applied to set active flip flop 46. This in turn sets flip flop 72, timer 76, and T counter 74. The box will now start transmitting its digits to the central station during the $T_o$ interval as determined by T counter 74 as described above. At the central station these digits will be compared, and if they match the digits originally sent by the central station, it will send a hold tone during $T_1$. The T counter 74 has an output 142 (FIG. 4) that supplies a one half second long signal during $T_1$, which signal is applied to AND gate 144 (FIG. 5). The other input of this gate 144 receives a signal from decoder 136 and therefore during this period it enables the ringback oscillator 106, so that speaker 110 emits the ringback tone. Also, during $T_1$ the gate 144 applies a signal through OR gate 146 that enables gate 114. Since microphone 116 is near loudspeaker 110, it will acoustically pick up the ringback tone and this will be transmitted through loop 20 back to the central station, where the central station 18 detects it. It will be seen that the routining function checks out virtually all of the circuits of the box, both analog and digital.

The output of decoder 136 is coupled to OR gate 142, and thus if there is a match, then the routine flip flop 130 and register 124 will be immediately cleared. This allows the box only one chance to outpulse its digits, since if the box is working perfectly, this will be done correctly the first time. At the end of routining a particular box, the box goes into the idle state and the central station sends out the digits for the next box on the loop.

Figure 7:
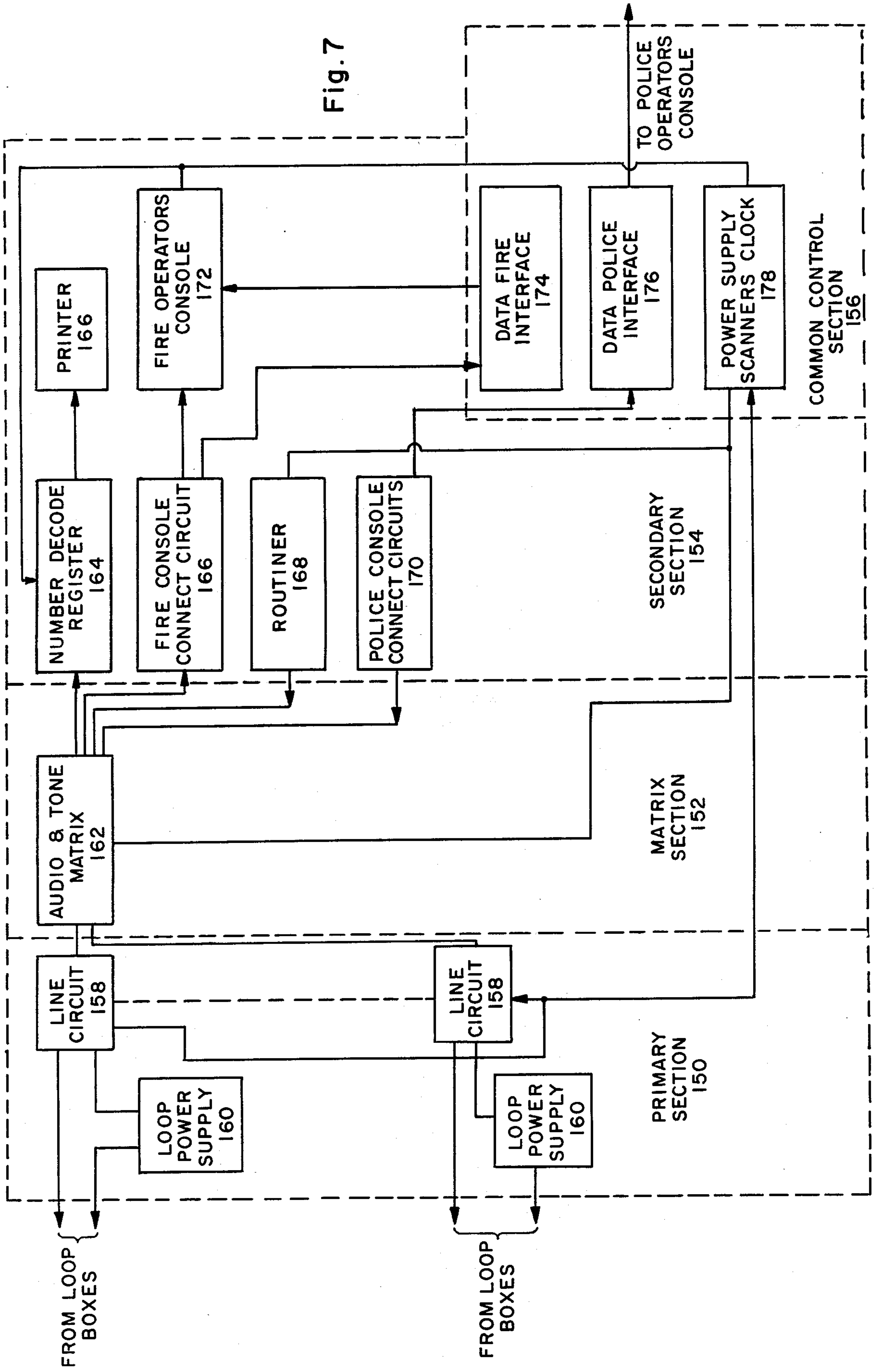
FIG. 7 is a block diagram of the central station.

FIG. 7 shows a block diagram for fire and police central stations 18 and 22. In general, it comprises four main sections, namely, a primary circuits section 150, which is the interface with the loop boxes; a matrix section 152, which connects the various loops to various secondary circuits; a secondary section 154, that couples to the loops via the matrix 154 and process the alarm signal, and a common control section 156, that controls the other sections and supplies them with power.

The primary section 150 comprises a plurality of line circuits 158, typically numbering 256 one for each of the loops 20. For clarity only the first and last are shown in FIG. 7. They each are coupled to the loops respectively and to loop power supplies 160 respectively. Internally, the line circuits have a long one tone detector (not shown) similar to that at the cell boxes for providing an output signal when a long one tone is present on the loop lines. The outputs of the line circuits 158 are respectively coupled to the 256 inputs of a audio and tone matrix 162 in matrix section 152.

Matrix 162 has a total of 32 outputs, which are coupled to the various circuits of secondary portion 154. Six outputs may be coupled to six number decoder registers 164 (only one is shown), which in turn are coupled to a printer 166. The exact number of matrix outputs coupled to register 164 depends upon the traffic. Although not shown, each register 164 comprises a box number register, parity check circuits, and a timer. Eight matrix outputs may be coupled to eight fire console connect circuits (only one shown) 166. Another matrix output goes to the routiner 168, while eight more matrix outputs may be coupled to eight police console connect circuits 170. The remaining nine matrix outputs are reserved as spares. The console connect circuit 166 is coupled to the fire operators console 172 and to fire data interface 174, both of which are in the common control portion 156 and are also coupled together.

A police data interface 176 is coupled to the police console connect circuit 170, which in turn is coupled to a remote police operators console (not shown). If desired, the police operators can be located at the same location as the fire operators, or both fire and police operators can be remotely located. Unit 178 having power supplies, scanners, and timing clocks is also located in control portion 156 and is coupled to virtually all other circuits.

In operation, the scanner 178 continuously scans the line circuits 158 looking for the presence of the long one tone pulse that occurs when a box has been activated. When a long one tone is detected by one of the detectors in line circuits 158, scanner 178 transfers the line number of that particular line circuit to a previously idle number decoder register in box 164, and then continues scanning the remaining line circuits 158.

The formerly idle register goes from an idle to a busy state, and sends a signal to the matrix 162, which connects it to the activated line. Then during the box time $T_o$, the box sends the zero and one tones representing the box number, which are decoded by the activated number decoder register, converted into DC levels, and stored in the box number register (not shown) in the activated number decoder register. The received box number is checked for both parity and for the proper number of digits, which can be done because the sending of a zero or one is a positive operation, and therefore the loss of a digit is apparent.

In the unlikely instance of a mistake, then the box and loop numbers as received are printed out by printer 166 as received and stored along with the time received and an error indication, e.g. a red asterisk. Because of the mistake, no hold tone will be transmitted by the central station back to the activated box, and hence the loop will be dropped by the matrix 162. During the next box $T_o$ interval, the box will again signal the central station, and if again the tones are incorrectly received, the error printout will again occur. This operation will be repeated until an operator notices the repeated error printouts, and cuts power in the particular loop by shutting off power in the particular power supply 160 that is coupled to that particular loop. The defective box will then be repaired or replaced.

If however, the number and parity checking operations indicate that the digits are being correctly received, then the activated number decoder register checks the service bit. If it is "fire" bit, scanner 178 scans the fire consoles 172 and finds one that is not being used, and likewise if a "police" service bit is received, an unused police console is found. The calls are therefore automatically distributed to the first available operator without regard to any groupings of the cable loop. If all consoles of the particular service are in use then a busy light flashes at all the consoles of that service so that the operators know to speed up their handling of the calls. This is especially true should an operator be talking to a box on the same loop as a calling box. When a console becomes available, scanner 178 sends to the appropriate fire or police console connect circuit the activated loop number, and the connect circuit establishes an audio path through the matrix, and then transfers the activated call box number stored in the activated number decoder register 164 to the activated operator console via the data interface 174. At the console a binary-to-decimal converter receives the activated call box number and applies it to a decimal display. The number decoder register then goes into a print state causing printer 166 to print out the time, loop number, call box number, and the number of the console that is handling that call. The number decoder register then goes back into the idle state, ready for a new call.

Thereafter the activated console connect circuit 166 or 170, which has a hold tone generator (not shown) in it, sends a hold tone to the box upon receiving the loop number from the scanner 178. The box then latches up in a manner described above in the description of the box. A light flashes and an audio alarm sounds at the activated console to indicate to the operator that there is a call at his console. The operator then presses a push-to-talk switch which stops the audible alarm and activates a transmit tone generator located at his console. The caller can then talk to the operator, and vice versa when the push-to-talk switch is released.

When the conversation has finished because the operator has all the relevant information about the emergency, or has determined that it is a false alarm, the operator presses a loop release button which shuts off the hold tone generator. The activated box then returns to its idle state, and the activated console is ready for the next call on the loop.

In order to carry out the routining function, the routiner 168 is activated. The scanner 178 then sequentially scans loops to find an idle loop. When routiner 168 finds a non busy loop, which can, of course, be the very first one tried, it sends a transmit tone without any accompanying hold tone, thus setting all the boxes on that loop into the routine mode. Then routiner 168 sends the box number digits of a particular box on the loop. If a response is had from the box the received digits are compared with those sent out, and then an audio test tone is sent to test the audio circuits. If this is detected correctly by a detector in routiner 168, routiner 168 goes on to routine the remaining boxes on the loop, and then the boxes on the other loops. If either of the digital or audio tests is failed by a box, routiner 168 bids for printer 166 and when it is free, causes it to print out the loop number, box number, the time, and the fact that the box failed the routining test. Thereafter, it routines the remaining boxes.

Figure 8:
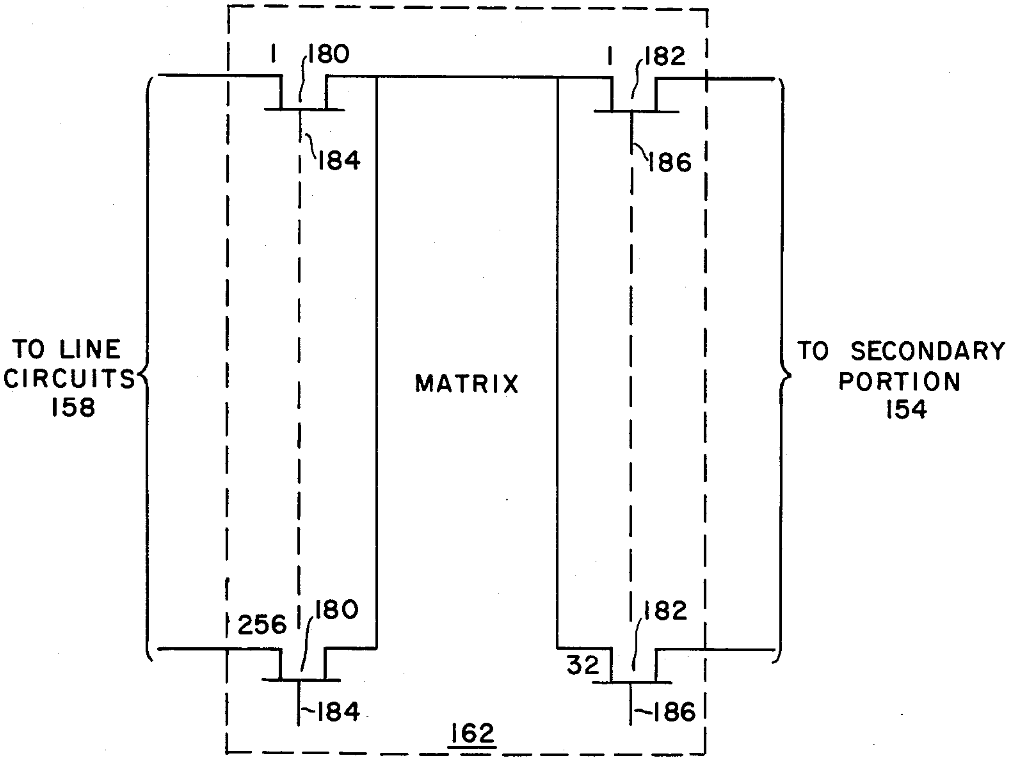
Fig. 8 Prior Art
FIG. 8 is a diagram of a prior art audio switching matrix.

Another feature of the system lies in the design of the matrix 162 which can best be understood by referring to FIG. 8, which shows a typical prior art 256 input circuits by 32 output circuits matrix as it might be used in the present invention. It will be seen that the input circuit comprises a total of 256 MOSFET gates 180 which have their input electrodes coupled to the 256 line circuits 158 respectively. Their output electrodes are coupled together and to all of the input electrodes of a total of 32 MOSFET gates 182. The output electrodes of gates 182 are coupled to the inputs of the secondary section circuits 154 respectively. The gate control electrodes 184 and 186 both gates 180 and 182 respectively are coupled to the scanner 178, which sequentially enables the output gates 182 through their control electrodes 186, but enables a particular input gate control electrode 184 only when the desired output gate 182 is being enabled. For example, if it is required, to connect the nineth line circuit to output number six, then the control electrode of the nineth input gate 180 will be enabled only when scanner 178 reaches and enables the sixth output gate 182 control electrode, and disables it thereafter. It will be seen that the total capacitance between the input and output gates 180 and 182 is at all times 256 plus 32 equals 288 times that of a single gate. This large capacitance causes cross-talk between the various connections that are sequentially established through the matrix 162.

Figure 9:
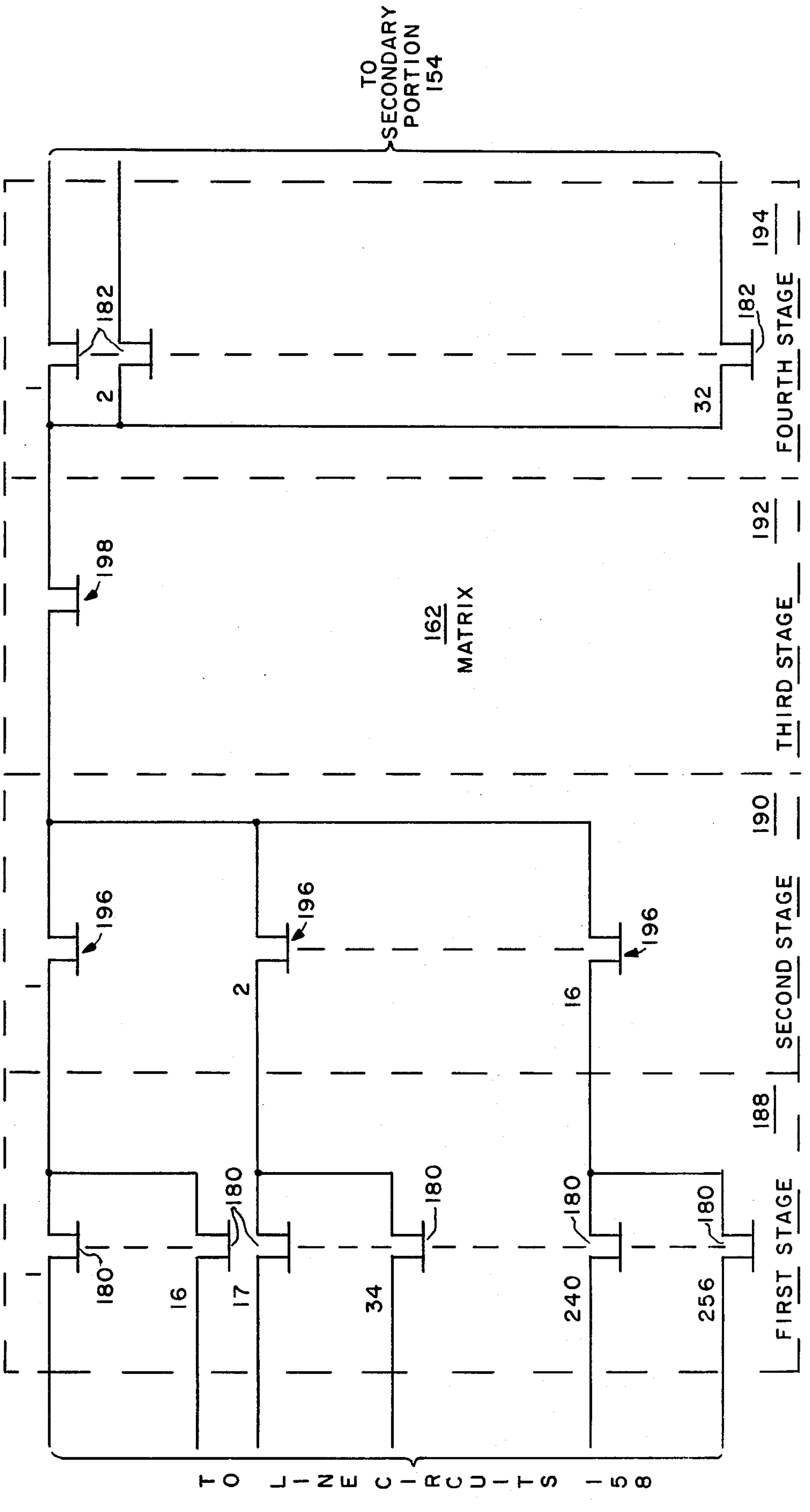
FIG. 9 is a diagram of an improved matrix.

FIG. 9 shows a matrix circuit 162 that overcomes the cross-talk problem. It comprises an input first stage 188, an intermediate second stage 190, another intermediate third stage, and an output fourth stage 194. The first stage 188 has a total of 256 input gates 180 that have input electrodes coupled to the line circuits 158 respectively. The output electrodes, however, are coupled together in groups of 16 for a total of 16 such groups. Second stage 190 has a total of 16 gates 196 having input electrodes respectively coupled to said 16 groups and output electrodes coupled together. Third stage 192 has only a single gate 198 with its input electrode coupled to the output electrodes of gates 196. Fourth stage 194, like the matrix of FIG. 8 has 32 output gates 182 with their input electrodes coupled together and to the output electrodes coupled to the circuits of secondary section 154 respectively. Each of the gates 180, 196, 198, and 182 have control electrodes, not shown for the sake of clarity, that are coupled to scanner 178.

In operation, the scanner 178 scans the output gates 182, sequentially enabling them. To establish a desired path through matrix 162 a selected one of the gates 180, the gate 196 to which the selected gate is coupled, and gate 198 are enabled by scanner 178 when it is enabling the selected one of the gates 182. It will be seen that the capacitance between stages 188 and 190 for any one selected path is 16 plus 1 equals 17 times that of the capacitance of a single gate. This is because for that one path only 16 of gates 180 in stage 188 are tied together to only one gate 196 of stage 190. Likewise, between stages 190 and 192 the capacitance is 16 plus 1 equals 17 that of a single gate, and between stages 192 and 194 it is 1 plus 32 equals 33. The total is 17 plus 17 plus 33 equals 67 times that of a single stage. This is far smaller than the 288 figure for the prior art matrix of FIG. 8, and hence cross-talk is greatly reduced.

It can be seen that the above invention can have numerous other embodiments than the one disclosed without departing from the spirit and scope of it. In particular, redundency can be used for the single units that handle the entire system. In addition, power supplies, memories, clocks, and portions of the matrix are duplicated with one unit handling actual traffic and another in hot standby to increase reliability. Also, the box microphone and the box speaker are housed behind a steel louvred plate to inhibit vandalism.

What is claimed is:

1. A method for establishing communication between at least one of a plurality of alarm stations coupled together and to a central station with a plurality of cable loops, said method comprising transmitting from said alarm station to said central station a signal indicative that one of said alarm stations has been activated, receiving said signal at said central station, and coupling the loop of said activated alarm station to a free one of a plurality of operator stations at said central station regardless of any groupings of said cable loops.

2. A method as claimed in claim 1 wherein said coupling step comprises sequentially scanning said operator stations until a free operator station is found.

3. A method as claimed in claim 1 further comprising storing at least a loop number portion of said signal at said central station after said transmitting step.

4. A central station adapted to be coupled to a plurality of alarm stations through a plurality of cable loops, said central station comprising means adapted to be coupled to said loops for receiving from an activated alarm station a signal representative that said activated alarm station has been activated, a plurality of operator stations, and means for establishing communication between said activated station and a free one of said operator stations comprising means coupled to said operator stations and said receiving means for coupling the loop of said activated station to a free operator station regardless of any groupings of said cable loops.

5. A central station as claimed in claim 4 wherein said coupling means further comprises means coupled to said operator stations for sequentially scanning said operator stations and to find a free operator station.

6. A central station as claimed in claim 4 wherein said signal comprises a loop number portion, and said establishing means comprises means coupled to said coupling means for storing said loop number portion.

7. A central station as claimed in claim 4 wherein said coupling means comprises means for reducing cross-talk between active cable loops comprising a matrix having a plurality of serially coupled stages, at least one of said stages having a plurality of gates, said gates having outputs parallel coupled in groups, whereby the total capacitance for a given path is reduced.

* * * * *